United States Patent

[11] 3,620,772

| [72] | Inventors | Nagayoshi Kitada<br>Kanagawa-ken;<br>Hideo Shimazaki, Kanagawa-ken; Yasushi<br>Komata, Tokyo, all of Japan |
|---|---|---|
| [21] | Appl. No. | 810,341 |
| [22] | Filed | Mar. 25, 1969 |
| [45] | Patented | Nov. 16, 1971 |
| [73] | Assignee | Ajinomoto Co., Inc.<br>Tokyo, Japan |
| [32] | Priority | Mar. 29, 1968 |
| [33] | | Japan |
| [31] | | 43/20545 |

[54] METHOD OF PRODUCING A MAILLARD REACTION PRODUCT HAVING MEATLIKE FLAVOR
5 Claims, No Drawings

[52] U.S. Cl. ..................................................... 99/140 R, 260/112 R
[51] Int. Cl. ..................................................... A23l 1/22
[50] Field of Search .......................................... 99/140 R

[56] References Cited
UNITED STATES PATENTS

| 2,887,388 | 5/1959 | Rusoff ......................... | 99/140 R |
| 2,934,435 | 4/1960 | May ............................. | 99/140 R |
| 2,934,437 | 4/1960 | Morton et al. ................ | 99/140 R |
| 3,102,815 | 9/1963 | Spotholz et al. ............. | 99/140 R |
| 3,102,816 | 9/1963 | Green et al. .................. | 99/140 R |
| 3,102,817 | 9/1963 | Green ........................... | 99/140 R |

FOREIGN PATENTS

| 294,769 | 8/1966 | Australia ...................... | 99/140 |

OTHER REFERENCES

Barnes et al., " Industrial Aspects of Browning Reaction"; Industrial & Engineering Chemistry; Vol. 39, No. 5; September 1947; pp. 1,167– 1,170.

Chemical Abstracts; Vol. 59; Dec. 1963; 14185H; " Browning Reactions of Amino Acid-Sugar Solutions Under Severe Conditions"

Chichester, G. O. et al.; Adranies in Food Research; Vol. 10; 1960 pp. 10 (copy in A.U. 171)

*Primary Examiner*—Morris O. Wolk
*Assistant Examiner*—Barry S. Richman
*Attorney*—Kurt Kelman ABSTRACT: When an aqueous solution of cystine or cysteine and of a reducing sugar is heated to 50°–120° C. at 70–200 kg./cm.$^2$, a Maillard reaction occurs at a rapid rate, and the reaction product obtained in 1 to 10 hours has a strong and pleasant meatlike flavor making it suitable as a seasoning for food.

3,620,772

METHOD OF PRODUCING A MAILLARD REACTION PRODUCT HAVING MEATLIKE FLAVOR

This invention relates to an improved method of producing a Maillard reaction product having meatlike flavor.

The Maillard reaction is the reaction of the amino group of an amino acid or peptide with the glycosidic hydroxyl group of sugar, followed by other, more complex, changes which result eventually in the formation of brownish pigments. (See the Merck Index 1968, 8th Edition)

It is known that those Maillard reaction products obtained by heating a mixture of sulfur-containing amino acids and reducing sugar, have a characteristic flavor similar to meat to some extent, and the flavor is improved especially when said Maillard reaction product is combined with another Maillard reaction product obtained by employing other kinds of amino acids or with vegetable protein hydrolyzate. Recently, it has been found that these Maillard reaction products can be employed as a flavoring material for foodstuffs.

However, the solubility of cystine or cysteine in water of neutral reaction is very small, and the Maillard reaction between sulfur-containing amino acids and reducing sugars is very slow.

We have now found that the Maillard reaction between cystine or cysteine and a reducing sugar is promoted when the reaction is carried out in slightly alkaline conditions under a pressure of 70 to 200 kg./cm.$^2$ and that the meatlike flavor of the Maillard reaction product prepared under the above-mentioned condition is improved in its quality and intensity.

Generally, in the process of the invention, the pH value of an aqueous solution containing cystine and/or cysteine and a reducing sugar is adjusted to 8 to 10, and the solution is introduced into an autoclave. The Maillard reaction is carried out, usually with agitation, at a temperature of 50° C. to 120° C. under a pressure of 70 to 200 kg./cm$^2$.

The reducing sugars employed in the present invention are pentoses and hexoses, and they may be aldoses or ketoses. The ratio (by weight) between cystine and/or cysteine and the reducing sugar is preferably 0.1–5.0:1.

The pressure during the reaction is preferably 70 to 200 kg./cm.$^2$, however, its optimal value changes to some extent according to the reaction temperature and time. When the reaction is carried out at the same temperature under atmospheric pressure, the flavor of the obtained Maillard reaction product is very weak and far from meatlike. If, on the other hand, the reaction is carried out under a pressure of more than 200 g./cm.$^2$, the reducing sugar in the mixture is decomposed and produces an undesirable smell. The reaction temperature is preferably 80° to 100° C. When the reaction is carried out at a temperature of more than 120° C. unpleasant smells such as a burning smell tend to become too strong. The reaction time is usually 1 to 10 hours, and preferably 3 to 5 hours.

The solution prepared by the Maillard reaction under high pressure is yellowish brown and it has a strong stimulating smell. It can be converted to a powder of a flavor like meat by conventional drying and powdering methods such as spray drying and drying under reduced pressure.

The strength of the meatlike flavor of this powder is increased and its quality is also improved in comparison with Maillard reaction products prepared under atmospheric pressure.

The powder obtained by heating a mixture of cystine and/or cysteine and reducing sugar, can improve a foodstuffs and drinks when added in an amount of 0.01–0.5 percent based on the weight of the foodstuffs and drinks.

The powder may also be used in an amount of 0.05–2 percent with other Maillard reaction products prepared from other amino acids such as glutamic acid, aspartic acid, tryptophan, histidine, threonine, valine, leucine, isoleucine, glycine, alanine, lysine and arginine, and reducing sugars.

It is preferred to use hydrolyzed vegetable protein or yeast extract with the powder of the present invention in order to improve the meatlike flavor.

EXAMPLE 1

A solution of cystine and xylose (1:1 in water) was adjusted to pH 9.5, heated at 100° C. and 130 kg./cm.$^2$ for 6 hours and then dried to a powder by spray-drying (powder (A)). As a control, a powder (B) was prepared in the same way but at 1 Kg/cm$^2$ The spray-drying was performed using a nozzle-type spray-dryer (the temperature at the entrance was 200°–220° C. and that of the outlet was 110°–120° C.).

The powders (A) and (B) were dissolved in water in concentrations of 10 mg. percent, 50 mg. percent and 100 mg. percent.

The solutions were offered to a panel of 50 members for an organoleptic comparison test for the stronger meatlike flavor. The results were as follows:

TABLE 1

| Concentration (mg.%) | Persons who selected sample (A) | Persons who selected sample (B) | |
|---|---|---|---|
| 10 | 38 | 12 | *** |
| 50 | 44 | 6 | *** |
| 100 | 34 | 16 | ** |

(Note) **:significantly different at 1% level

***:significantly different at 0.1% level

EXAMPLE 2

10 g. cystine and 10 g. xylose were added to 60 ml. water and the solution was adjusted to pH 9.5, poured into an autoclave and held at 100° C. for 3 hours at the starting pressure shown in table 2 by means of nitrogen gas.

The amount of residual unreacted xylose was measured. The results were as follows:

TABLE 2

| Starting pressure (kg./cm.$^2$) | Residual xylose (%) |
|---|---|
| 40 | 2.06 |
| 50 | 1.92 |
| 70 | 1.54 |
| 100 | 1.30 |
| Atmospheric pressure | 1.94 |

As is apparent from table 2, the amount of residual xylose was small, and the reaction velocity was increased when the Maillard reaction was carried out under a pressure of more than 70 kg./cm.$^2$.

The Maillard reaction product prepared at 100 kg./cm.$^2$ and that prepared under atmospheric pressure were subjected to thin-layer chromatography.

The Rf values of a colored material of the Maillard reaction (A) and a colored part in ninhydrin reaction (B) were measured. As a developer, a mixture of methanol, butanol and water (1:1:1) was employed.

TABLE 3

Rf value

|  | (A) | (B) |
| --- | --- | --- |
| Atmospheric pressure | 0.68 | 0.57 |
| 100 kg./cm.² | 0.60 | 0.57 |

When methanol-CHCl₃ (1:1) solvent was employed as a developer, the Rf values of (A) and (B) were as follows:

TABLE 4

|  | Rf value | |
| --- | --- | --- |
|  | (A) | (B) |
| Atmospheric pressure | 0.54 | 0.48 |
| 100 kg./cm.² | 0.50 | 0.48 |

As it is apparent from table 3 and table 4, the colored Maillard reaction product prepared at high pressure is different from that prepared at atmospheric pressure, and accordingly the character of the flavor is also different.

The absorbency at $\lambda$ max 330 $\mu$ was measured in solutions containing each 0.1 percent of the Maillard reaction products prepared by reacting cystine and xylose for the time shown in table 5 under a pressure of 100 kg./cm.² and under atmospheric pressure. The results were as follows:

TABLE 5

| Reaction Time | Absorbency (—log T) | |
| --- | --- | --- |
| (min.) | 100 kg./cm.² | Atmospheric pressure |
| 30 | 538 | 493 |
| 60 | 580 | 530 |
| 90 | 600 | 530 |
| 120 | 630 | 570 |
| 210 | 620 | 560 |

As it is apparent from table 5, the absorbency of the Maillard reaction products prepared under high pressure was greater than that of prepared under atmospheric pressure in the same time. Therefore, it is clear that the rate of the Maillard reaction is promoted by high pressure.

EXAMPLE 3

10 g. cystine and 1.5 g. xylose were dissolved in 50 ml. water and the pH of the solution was adjusted to 9.5 with caustic soda. The solution was poured into an autoclave and the reaction was carried out with agitation at 100° C. and 140 kg./cm.², for 3.5 hours. By spray-drying the reaction solution, we obtained a powder having a pleasant flavor in a yield of 90 percent.

The powder was orange-yellow and it was readily soluble in water.

A solution containing 0.5 percent of the powder was offered to a panel of 20 members for an organoleptic test. When the panel was asked to identify the odor of the solution, 18 members indicated that it smelled like food of animal origin and 15 members indicated also that it had a meatlike smell.

EXAMPLE 4

10 g. cystine and 10 g. xylose were dissolved in 60 ml. water and the solution was adjusted to pH 10.0 with caustic soda. The solution was heated at 85° C. for 20 minutes with aeration and adjusted to pH 8.0. After the solution was poured into an autoclave, the pressure in the autoclave was kept at 100 kg./cm.² by means of nitrogen gas and the contents of the autoclave were heated at 100° C. for 3.5 hours with agitation.

The Maillard reaction solution was spray-dried to a powder.

A solution containing 0.1 percent of the powder was offered to a panel of 20 members for an organoleptic test. 17 members of the panel indicated that the solution had a pleasant meatlike flavor.

EXAMPLE 5

20 parts sodium glutamate, 1 part xylose and 0.05 part of a mixture containing equivalent amounts of cystine and ribose were added to 5 parts of water, and the pH value of the solution was adjusted to 9.0. The solution was reacted at 90° C. at 100 kg./cm.² for an hour and dried to a powder in a spray-dryer of the nozzle type.

To a soup of buckwheat noodles was added 0.05 percent by weight of the powder prepared as described above, and the soup was offered to a panel of 20 members for a comparison test with a control. Nineteen members of the panel preferred the flavor of the soup containing said powder to the soup without powder. It was also pointed out by 12 members of the panel that the soup containing the powder had a meatlike flavor.

What is claimed is:

1. A method of producing a Maillard reaction product which comprises heating an aqueous solution of a reducing sugar and of a material selected from the group consisting of cystine and cysteine at a temperature of 50° to 120° C. and a pressure of 70 to 200 kg./cm.² for a period of from 1 to 10 hours.

2. A method as set forth in claim 1, wherein said solution prior to said heating is adjusted to a pH of about 8 to 10.

3. A method as set forth in claim 1, wherein said solution contains from 0.1 to 5.0 parts by weight cystine or cysteine per part of said reducing sugar.

4. A method as set forth in claim 1, wherein the reaction solution is dried to a powder after said heating.

5. A method of improving the flavor of a food which comprises adding to said food a flavor enhancing amount of a Maillard reaction product prepared by heating an aqueous solution of a reducing sugar and of a material selected from the group consisting of cystine and cysteine at a temperature of 50° to 120° C. and a pressure of 70 to 200 kg./cm.² for a period of from 1 to 10 hours.

* * * * *